(12) United States Patent
Cai et al.

(10) Patent No.: US 10,519,561 B2
(45) Date of Patent: Dec. 31, 2019

(54) STEERING GEAR ASSEMBLY AND METHOD OF MANUFACTURING SAME

(71) Applicant: China Automotive Systems, Inc., Wuhan, Hubei Province (CN)

(72) Inventors: Haimian Cai, Ann Arbor, MI (US); Shen Li, Sterling Heights, MI (US); Bokai Jin, Troy, MI (US); Gangchun Xu, Hubei (CN); Min Nie, Hubei (CN); Xiaobin Wang, Hubei (CN)

(73) Assignee: CHINA AUTOMOTIVE SYSTEMS, INC., Wuhan, Hubei Province (CN)

( * ) Notice: Subject to any disclaimer, the term of this patent is extended or adjusted under 35 U.S.C. 154(b) by 0 days.

(21) Appl. No.: 15/634,274

(22) Filed: Jun. 27, 2017

(65) Prior Publication Data

US 2017/0370463 A1 Dec. 28, 2017

(30) Foreign Application Priority Data

Jun. 27, 2016 (CN) .................... 2016 2 0644418 U
Apr. 10, 2017 (CN) .................... 2017 2 0364146 U

(51) Int. Cl.
*C25D 11/02* (2006.01)
*F16H 57/032* (2012.01)
(Continued)

(52) U.S. Cl.
CPC ............ *C25D 11/022* (2013.01); *B23P 15/00* (2013.01); *B62D 3/02* (2013.01); *C22C 21/02* (2013.01); *C25D 11/04* (2013.01); *F16H 57/025* (2013.01); *F16H 57/032* (2013.01); *B23P 11/00* (2013.01); *B23P 2700/50* (2013.01);
(Continued)

(58) Field of Classification Search
CPC ................ F16H 57/032; F16H 57/025; F16H 2057/02017; F16H 2057/02026; F16H 2057/02091; F16H 57/02; F16H 2057/02043; F16H 2057/02039; F16H 2057/02047; F16H 2057/02086; F16H 2057/02095; F16H 57/028; F16H 2057/0325; C25D 11/022; C25D 21/02;
(Continued)

(56) References Cited

U.S. PATENT DOCUMENTS 3,524,799 A * 8/1970 Howard ................ C25D 11/06
205/330
5,641,181 A 6/1997 Galhotra
(Continued)

*Primary Examiner* — Jeremy R Severson
(74) *Attorney, Agent, or Firm* — Dickinson Wright PLLC

(57) ABSTRACT

A steering gear housing and method of manufacturing same are provided. The steering gear housing is comprised of aluminum alloy and is at least partially anodized. The steering gear housing defines a plurality of mounting apertures. A plurality of nuts is fit into a respective one of the mounting apertures for use in mounting to a vehicle. Each of the nuts defines a plurality of splines for establishing a press-fit relationship between the mounting apertures and the nuts. The method involves casting a steering gear housing defining a plurality of mounting apertures out of aluminum alloy. Next, the casted steering gear housing is at least partially anodized. After anodization, a plurality of nuts is fit into respective ones of the mounting apertures. The nuts define splines for allowing a press-fit relationship to be established between the mounting apertures and the nuts.

10 Claims, 6 Drawing Sheets

(51) Int. Cl.
*C22C 21/02* (2006.01)
*F16H 57/025* (2012.01)
*B23P 15/00* (2006.01)
*C25D 11/04* (2006.01)
*B62D 3/02* (2006.01)
*F16H 57/02* (2012.01)
*B23P 11/00* (2006.01)

(52) U.S. Cl.
CPC .............. *F16H 2057/02017* (2013.01); *F16H 2057/02082* (2013.01); *F16H 2057/02091* (2013.01)

(58) Field of Classification Search
CPC .......... C25D 11/04; B23P 15/00; B23P 11/00; B23P 2700/50; B62D 3/02
See application file for complete search history.

(56) References Cited

U.S. PATENT DOCUMENTS

| | | | |
|---|---|---|---|
| 7,121,377 B2 | 10/2006 | Klais et al. | |
| 7,753,148 B2 * | 7/2010 | Kokot | B60K 25/06 |
| | | | 180/53.1 |
| 9,346,489 B2 | 5/2016 | Dutsky et al. | |
| 2011/0236253 A1 * | 9/2011 | Kimura | C22C 1/00 |
| | | | 420/535 |
| 2016/0017811 A1 * | 1/2016 | Martin | F02C 3/04 |
| | | | 60/805 |
| 2016/0186796 A1 * | 6/2016 | Verdier | F16B 37/044 |
| | | | 29/458 |

* cited by examiner

STEERING GEAR ASSEMBLY AND METHOD OF MANUFACTURING SAME

CROSS REFERENCE TO RELATED APPLICATION

This U.S. Utility application claims the benefit of and priority to Chinese Application Numbers 201720364146.3 filed Apr. 10, 2017 and 201620644418 filed Jun. 27, 2016, the entire disclosures of which are both hereby incorporated by reference.

BACKGROUND OF THE INVENTION

1. Field of the Invention

The invention generally relates to a steering gear assembly and method of manufacturing same, and more particularly to a steering gear housing for receiving steering gears for an automotive vehicle.

2. Description of the Prior Art

Automotive steering systems include steering gears which are utilized for turning the wheels of a vehicle. Oftentimes steering gears are disposed in steering gear housings which modernly leverage pressurized fluid to facilitate relative movement between the steering gears. A steering gear housing is generally made of cast iron and can weigh 15 $lbs$ or more. The weight of the steering gear housing can significantly affect gas mileage and can often times lead to unnecessary wear and tear of the vehicle when subjected to vibrational loads. Furthermore, cast iron steering gear housings subjected to environmental conditions rust overtime. Accordingly, there remains a need for an improved steering gear housing.

SUMMARY OF THE INVENTION

The subject invention provides for a steering gear housing that is comprised of aluminum alloy and is at least partially anodized to reduce the overall weight of the steering gear housing as compared to its cast iron counterpart. The steering gear housing includes a plurality of through walls bounding mounting apertures. A plurality of nuts are press-fit into a respective one of the mounting apertures for use in mounting to a vehicle. Each of the nuts defines a plurality of splines for establishing a press-fit relationship between the mounting apertures and the nuts.

The invention also provides a method of manufacturing a steering gear housing. The method includes casting an aluminum steering gear housing defining a plurality of mounting apertures and at least partially anodizing the casted aluminum steering gear housing. After anodization, a plurality of nuts, each defining splines, are press-fit into respective ones of the mounting apertures for establishing a press-fit relationship between the mounting apertures and the nuts.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
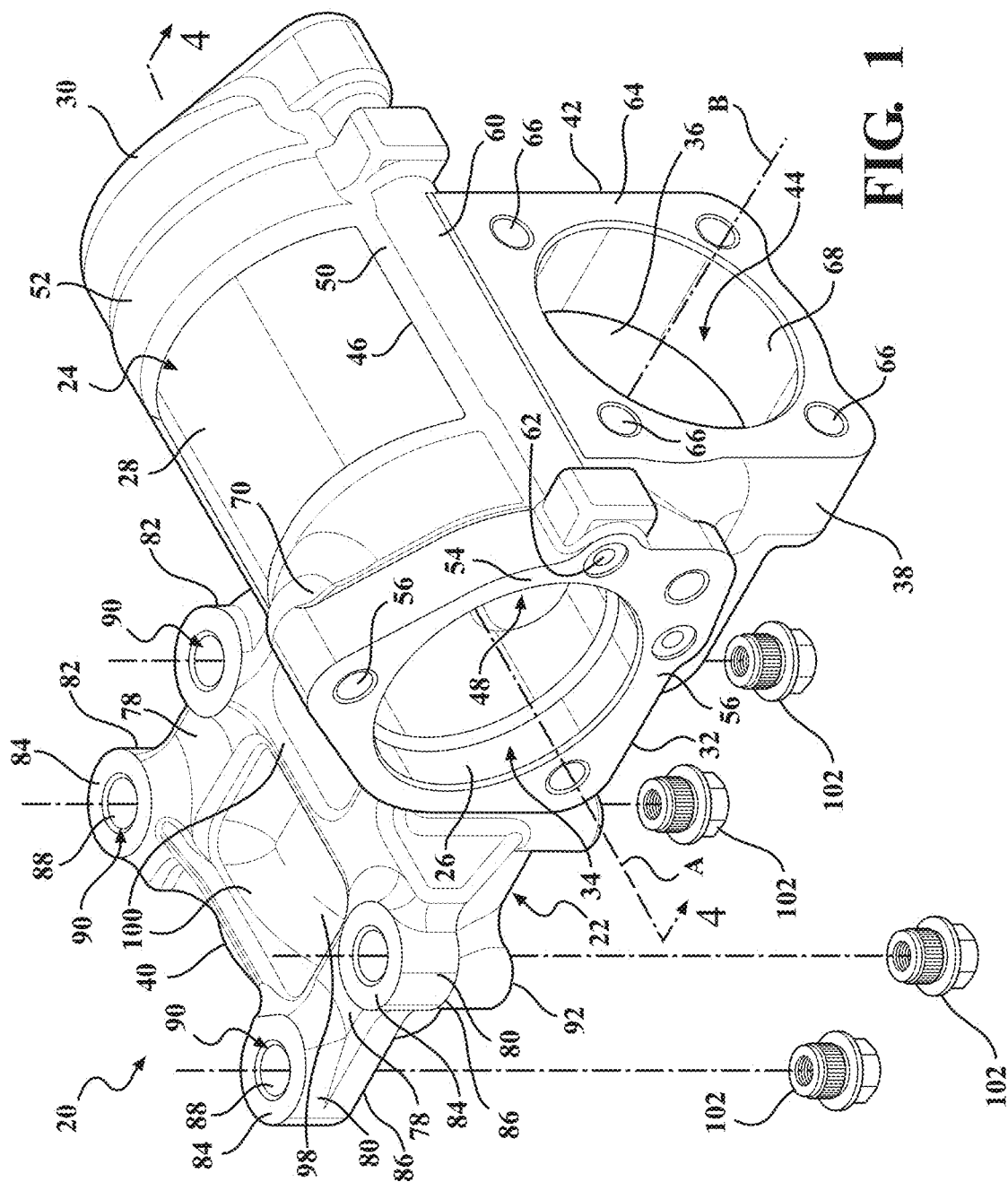
FIG. 1 is a perspective view of an anodized steering gear housing comprised of aluminum alloy that includes a plurality of nuts press-fit into a respective one of a plurality of through walls in accordance with an aspect of the invention.

Example embodiments will now be described more fully with reference to the accompanying drawings, wherein like numerals indicate corresponding parts throughout the several views. The invention provides a steering gear assembly and a method of manufacturing same. The steering gear assembly includes a steering gear housing 20, generally shown in FIGS. 1 and 3, which defines a sector body 22 and an input body 24 for receiving steering gears of an automotive vehicle.

The input body 24 has a generally cylindrical shape and defines an inner surface 26 and an outer surface 28. The input body 24 extends along an input axis A between a input end 30 being closed and an input attachment end 32 that opens into a input shaft bore 34 bounded by the inner surface 26. The sector body 22 also has a generally cylindrical shape and defines an inner wall 36 and an outer wall 38. The sector body 22 extends along a sector axis B between a mounting end 40 and a sector attachment end 42 that opens into a sector shaft bore 44 bounded by the inner wall 36. The input axis A and the sector axis B extend in a perpendicular and spaced relationship relative to one another. Consequently, the input body 24 intersects and merges into the sector body 22 at a shared wall 46 that defines a gear communication hole 48 disposed in fluid communication with both of the sector shaft bore 44 and the input shaft bore 34. In this arrangement, the input attachment end 32 is disposed in adjacent and perpendicular relationship to the sector attachment end 42. The shared wall 46 transitions between the input body 24 and the sector body 22 and defines a generally arc-shape fillet 50.

The steering gear housing 20 is comprised of aluminum alloy, reducing the overall weight from corresponding cast iron steering gear housings and thus improving the overall performance of the vehicle. As discussed in further detail below, the aluminum steering gear housing 20 weighs less than half of an equally sized cast iron steering gear housing. In addition, aluminum has a high value of thermal conductivity and can therefore dissipate excess heat during periods of heavy use.

Figure 6A:
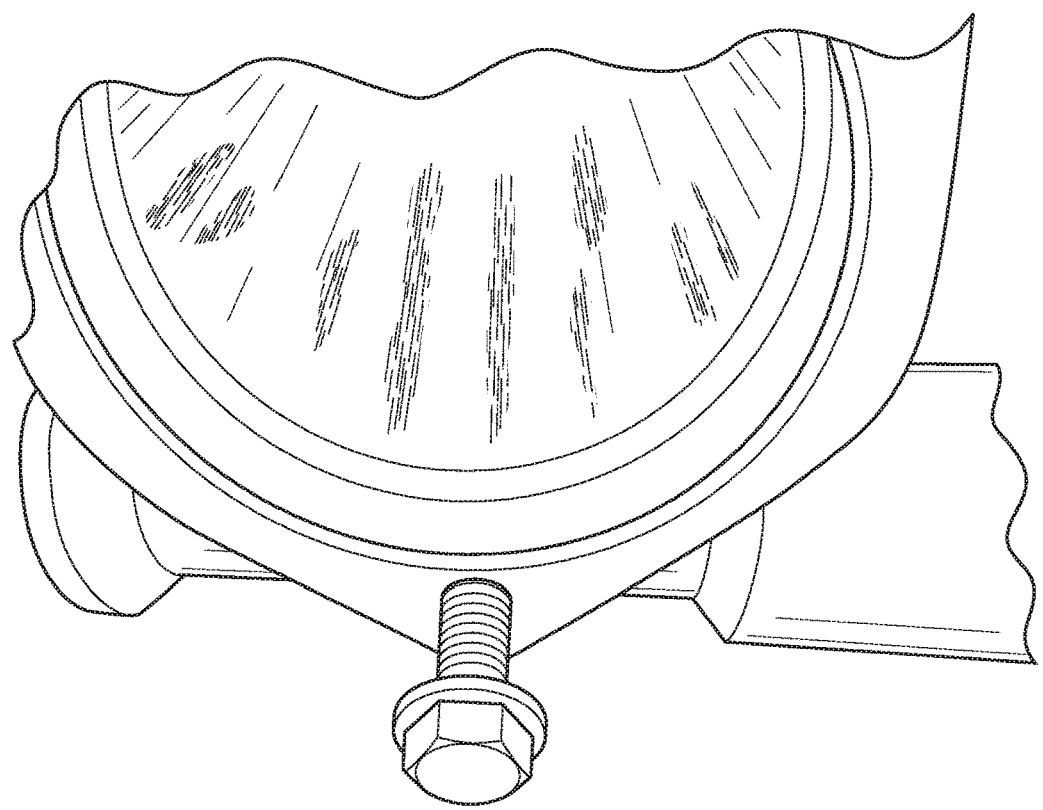
FIG. 6 is a view of a shaft bore of a steering gear housing comprised of cast iron and subjected to wear testing.
Figure 6B:
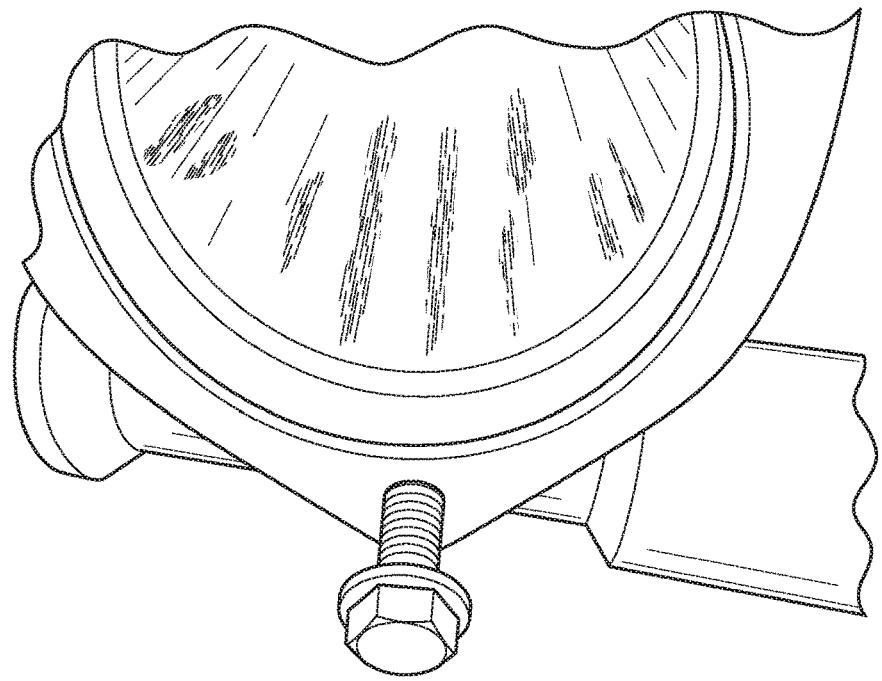
Figure 7A:
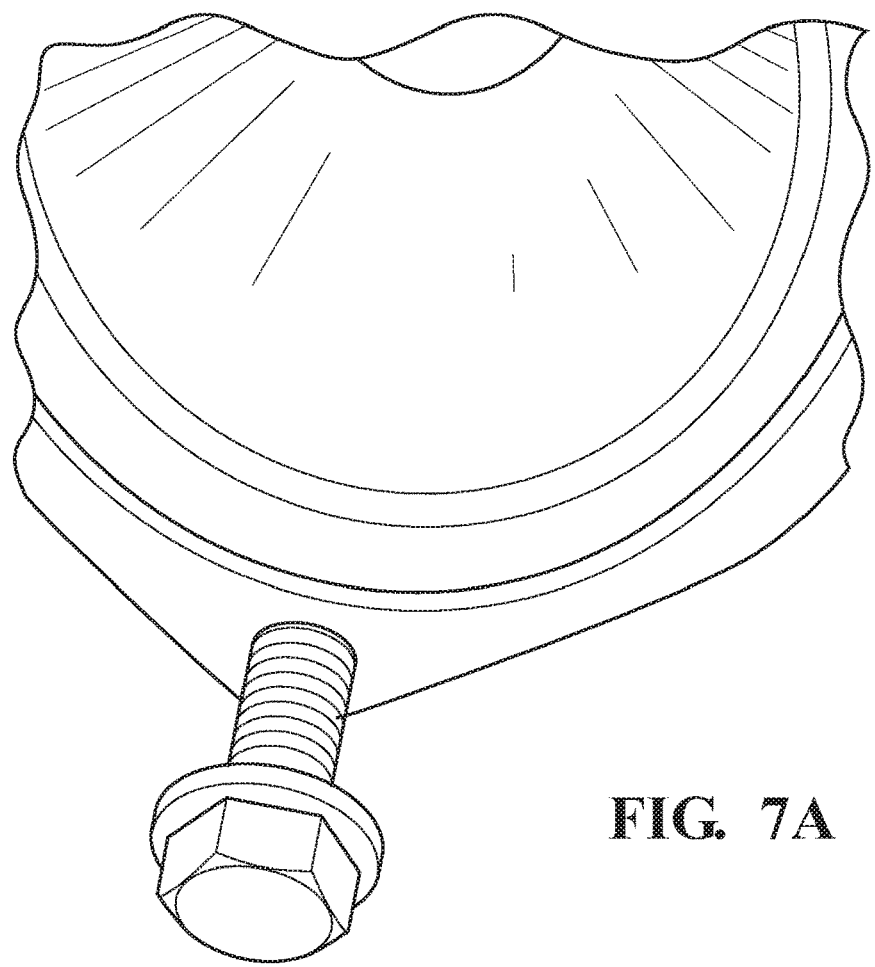
FIG. 7 is a view of a shaft bore of a steering gear housing comprised of anodized aluminum alloy and subjected to wear testing.
Figure 7B:
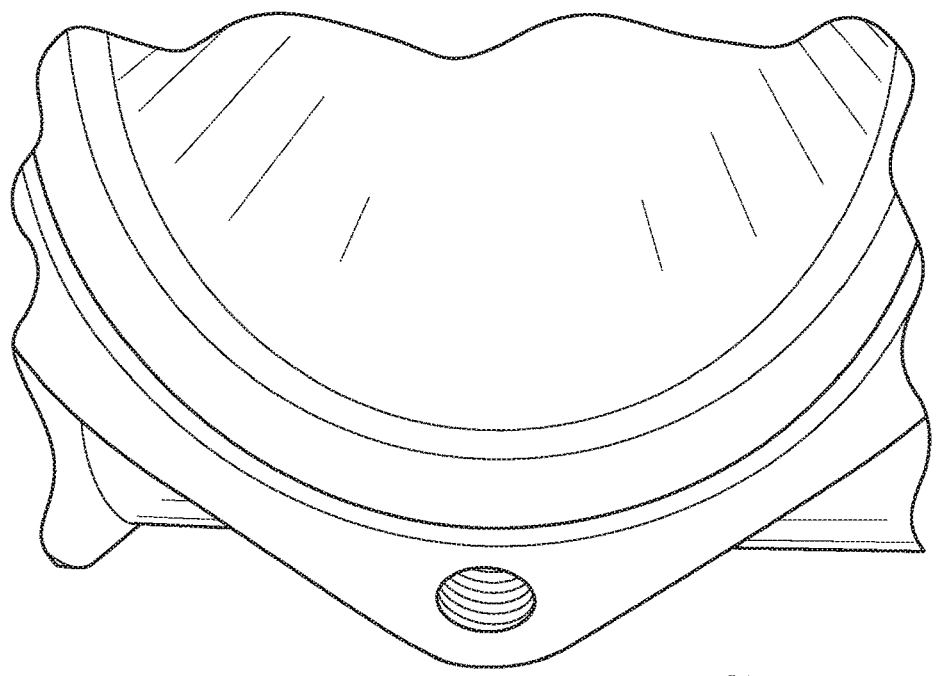

During production, the aluminum steering gear housing 20 is at least partially anodized to increase corrosion resistance, help retain a lubrication coating, and increase wear resistance of the aluminum steering gear housing 20. Accordingly, the anodization assists in maintaining the steering gear housing 20 in optimum condition throughout the life of a vehicle. The portion of a steering gear housing that interacts with the steering gears and steering fluid is most susceptible to wear and corrosion which is particularly evident in steering gears comprised of cast iron, as shown in FIG. 6. Accordingly, in one embodiment, only the inner surface 26 bounding the input shaft bore 34 and the inner wall 36 bounding the sector shaft bore 44 are anodized. FIGS. 6 and 7 demonstrate the wear and tear of bores of a steering gear subjected to at least 150,000 miles of vehicle operation. FIG. 6 illustrates the visible wear and tear of a steering gear housing comprised of cast iron. Whereas, FIG. 7 illustrates no visible wear and tear of a like steering gear housing comprised of aluminum alloy. In another non-limiting example, the complete steering gear 20 is anodized to provide the benefits of anodization to the entire steering gear housing 20. It should also be appreciated that when the steering gear housing 20 is anodized, its ability to retain dye, paint, or any other protective or aesthetic coating is also improved.

A plurality of nuts 102, best illustrated in FIGS. 1 and 2 are connected to the steering gear housing 20 for bearing and distributing weight and vibrational loads of the steering gear housing 20 when mounted to a vehicle. Furthermore, each of the nuts 102 defines a plurality of splines 118 for establishing a press-fit relationship and thus preventing relative rotational movement between the steering gear housing 20 and each of the nuts 102.

Figure 4:
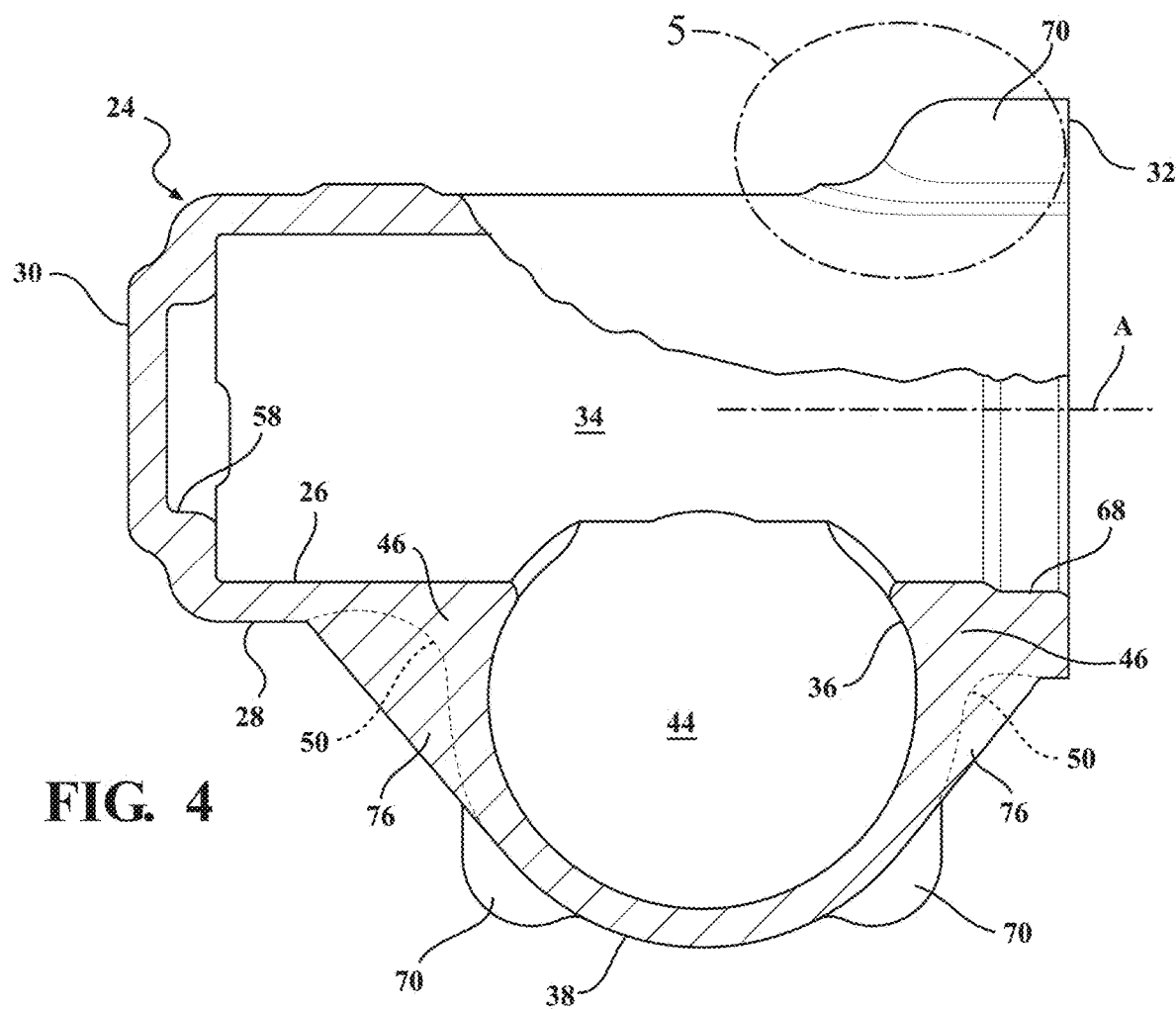
FIG. 4 is a cross-sectional view of the steering gear housing illustrating shaft bores defined by the steering gear housing and disposed in fluid communication with one another.

As shown in FIG. 1, the input body 24 of the aluminum steering gear housing 20 defines at least one circular reinforcement 52 that has an annular shape and extends about the input axis A on the outer surface 28 of the input body 24 for increasing strength. The input attachment end 32 includes a flat input face 54 that has a thickness and extends radially around the outer wall 38. The flat input face 54 defines a plurality of input holes 56 therein for receiving fasteners of respective steering gears. The inner surface 26 of the input body 24 defines at least one step 58, shown in FIG. 4, adjacent to the input end 30. A reinforcement bar 60 extends across the outer surface 28 of the input body 24 between the input end 30 and the input attachment end 32. The reinforcement bar 60 defines an internal channel 62 therein opening at the flat input face 54 and traversing the reinforcement bar 60 to the input end 30 turning inwardly and opening into the input shaft bore 34 through the at least one step 58. In this arrangement, the internal channel 62 acts as a fluid conduit between ends 30, 32 of the input body 24. The inner surface 26 of the input body 24 further defines a counter bore 68 adjacent to the input attachment end 32 for creating a tight connection between the input body 24 and an automotive part such as a rotary valve.

Figure 3:
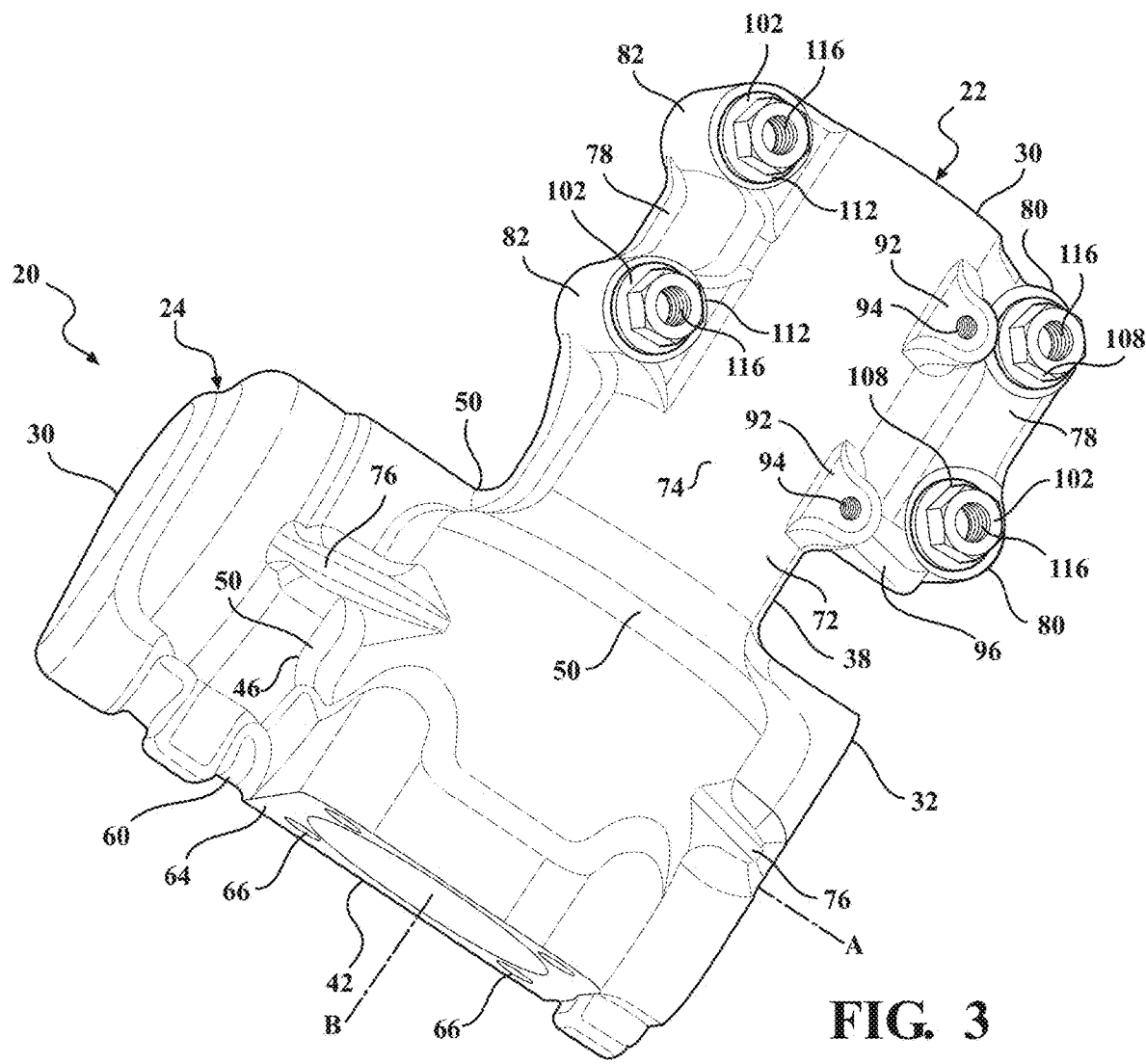
FIG. 3 is a perspective view of a bottom of the steering gear housing illustrating nuts in the press-fit relationship with a respective one of a plurality of mounting apertures in accordance with another aspect of the invention.
Figure 5:
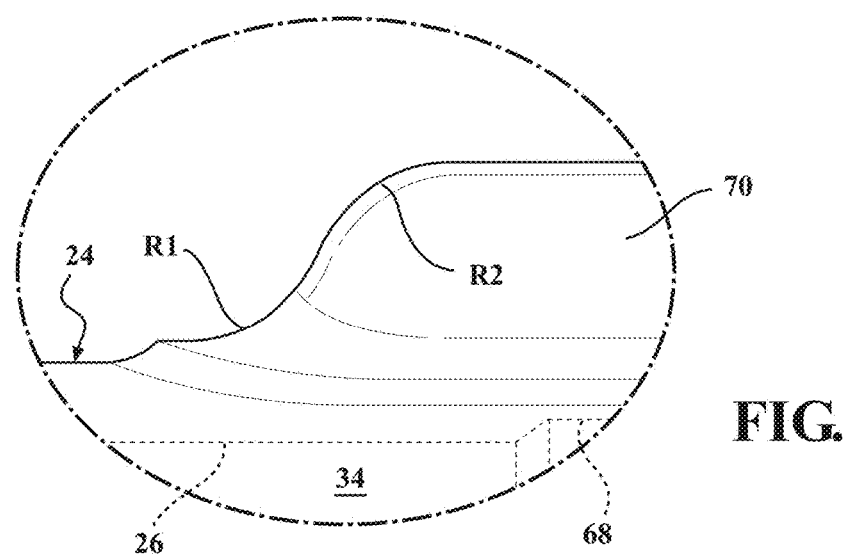
FIG. 5 is a magnified view of a portion of FIG. 4 illustrating an attachment rib disposed on the steering gear housing for attaching the steering gear housing to a automotive part in accordance with another aspect of the invention.

As best illustrated in FIG. 3, the sector attachment end 42 of the aluminum steering gear housing 20 includes a flat sector face 64 that has a thickness and extends radially around the outer surface 28 defining a plurality of sector holes 66 therein for receiving fasteners of respective steering gear assemblies. A plurality of attachment ribs 70 each extend along the input attachment end 32 and the sector attachment end 42 and are adjacent to at least one of the sector holes 66 and at least one of the input holes 56 for allowing deeper sector holes 66 and input holes 56 and also providing extra reinforcing strength. Each of the attachment ribs 70 can extend in the shape of opposing radii R1 and R2 as illustrated in FIG. 5. A reinforcement plate 72 extends along the outer wall 38 of the sector body 22 between the input end 30 and the mounting end 40 opposite the input body 24 and merges into the shared wall 46. The reinforcement plate 72 transitions from the outer wall 38 of the sector body 22 to define a generally flat and smooth surface 74 along the sector gear housing 20. A reinforcement rib 76 extends in a perpendicular relationship to the reinforcement plate 72 across the shared wall 46 between the input end 30 and the input attachment end 32.

The sector body 22 further defines a pair of flanges 78, as shown in FIGS. 1 and 3, that extend outwardly on opposite sides of the sector body 22 adjacent to the mounting end 40. The flanges 78 each define a plurality of mounting pads 80, 82 that extend in a perpendicular relationship to the axis B. The mounting pads 80, 82 each define a press-fit face 84 and a fastener-entry face 86 on opposite sides of the mounting pads 80, 82. Each of the mounting pads 80, 82 further define through wall 88 extending between the press-fit face 84 and the fastener-entry face 86 bounding a mounting aperture 90. The mounting pads 80, 82 include a first set of mounting pads 80 sharing one of the flanges 78 and a second set of mounting pads 82 sharing another of the flanges 78. The first set of mounting pads 80 having a shorter distance between the press-fit face 84 and the fastener-entry face 86 as the second set of mounting pads 82. A pair of projections 92 is spaced between the first set of mounting pads 80 and the sector body 22 and extends in a parallel and adjacent relationship to the first set of mounting pads 80. Each of the projections 92 define a threaded hole 94 for connection of wire holding fasteners. A reinforcing member 96 extends between at least one of the projections 92 to the flange 78 with the first set of mounting pads 80. The sector body 22 further defines at least one recess 98 between the flanges 78 but could include more as needed to further reduce weight. The sector body 22 also defines a pair of reinforcement webs 100 that each extend between opposite mounting pads 80, 82 along the at least one recess 98.

Figure 2A:
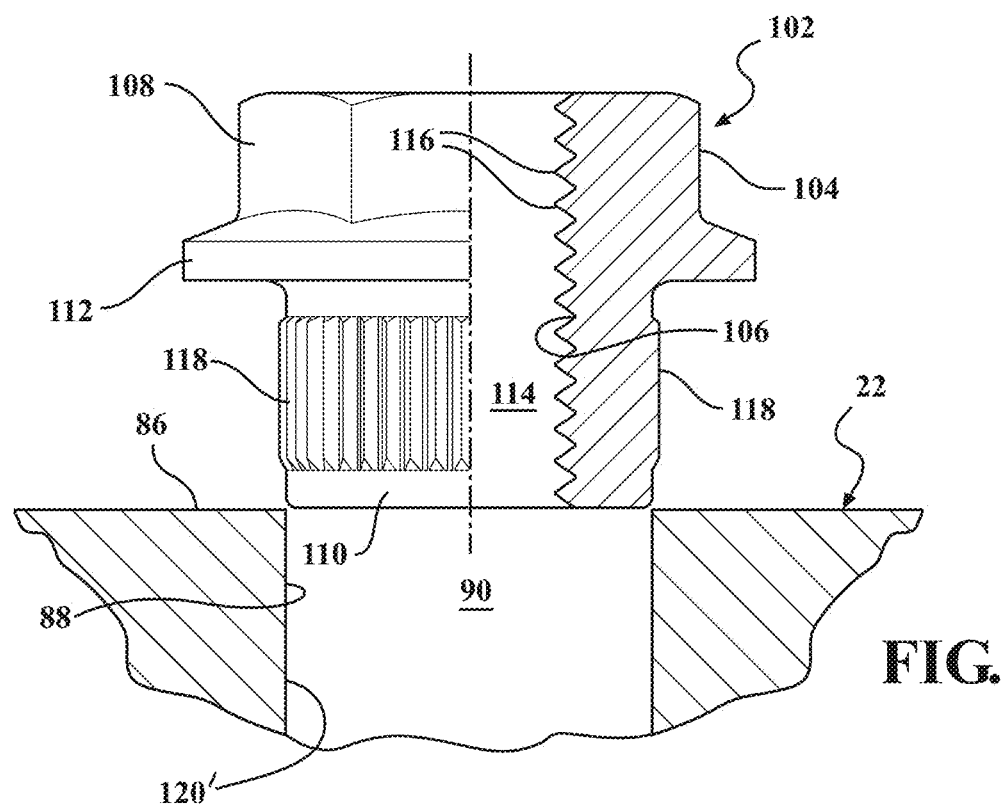
FIG. 2A is a cross-sectional view of one of the nuts illustrating a plurality of splines for pressing into and deforming the respective through wall to establish a press-fit relationship in accordance with one embodiment of the invention.
Figure 2B:
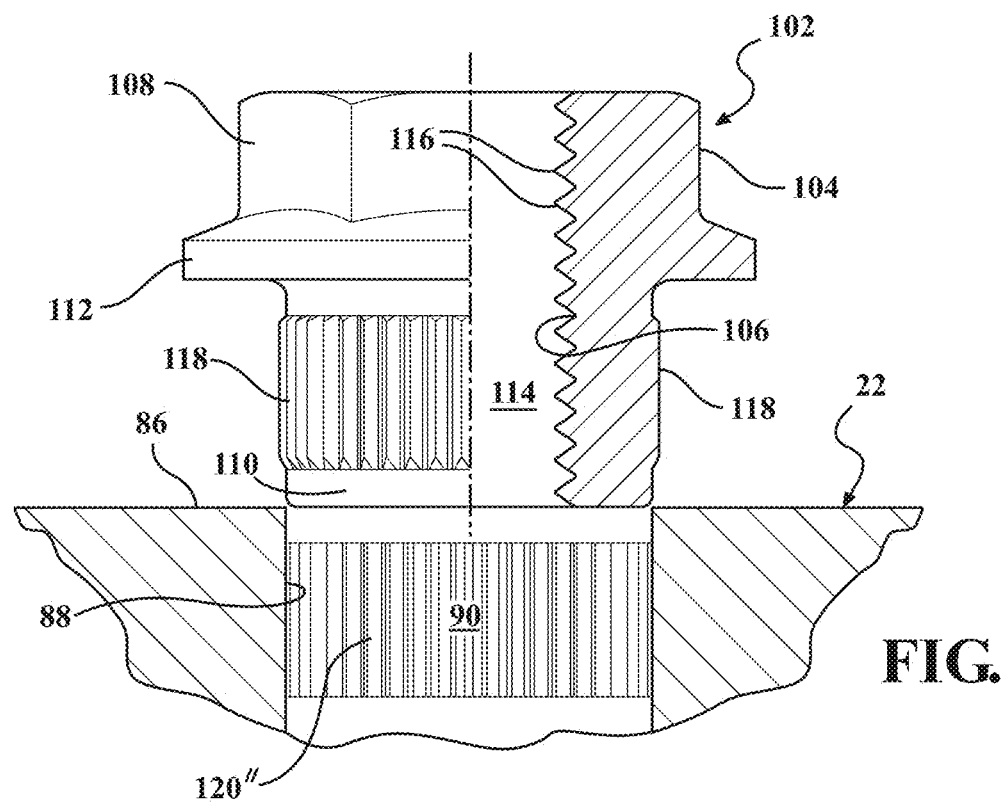
FIG. 2B is a cross-sectional view of one of the through walls illustrating a splined surface for mating with the splines of one of the nuts to establish the press-fit relationship in accordance with another embodiment of the invention.

The plurality of nuts 102, generally indicated in FIGS. 2A and 2B, each have an exterior nut surface 104 and an interior nut surface 106 and are press fit into a respective one of the mount apertures 90 of the mounting pads 80, 82. Each of the plurality of nuts 102 have a hexagonal head 108 extending to a press-fit rod 110. However, other shapes of the head 108 could be utilized without departing from the scope of the subject invention. A mounting flange 112 extends around the exterior nut surface 104 between the hexagonal head 108 and the press-fit rod 110 and is disposed in abutting relationship with the press-fit face 84 of the mounting pads 80, 82. The interior nut surface 106 bounds a fastener hole 114 and defines a thread 116. It should be appreciated that the fastener hole 114 does not need to define a thread 116, but could define any internal surface suitable for receiving a fastener. The exterior nut surface 104 of the press-fit rod 110 defines the plurality of splines 118 for mating the mounting apertures 90 in the aforementioned press-fit relationship. In one embodiment shown in FIG. 2A, the through walls 88 each define a receiving surface 120' that is generally smooth but deformed by the splines 118 in the press-fit relationship. In yet another embodiment shown in FIG. 2B, the through walls 88 defines a splined surface 120" for mating with the splines 118 of the nut 102 in the press-fit relationship. Each of the splines 118 could define a cross section of generally triangular shape and the splines 118 could also be disposed uniformly.

As previously discussed, the steering gear housing 20 is comprised of aluminum alloy to reduce the overall weight. During manufacture the steering gear housing 20 is anodized. The anodization provides many benefits as described in the preceding paragraphs. In one embodiment, the aluminum alloy includes concentrations of Al, Si, Fe, Cu, Mn, Mg, Zn, Ti, Pb, Zr and Sn. In a specific embodiment, the aluminum alloy comprises: 6.5-7.5% by weight of the Si; 0.2% by weight of the Fe; 0.1% by weight of the Cu; 0.1% by weight of the Mn; 0.25-0.45% by weight of the Mg; 0.1% by weight of the Zn; 0.08-0.2% by weight of the Ti; 0.03% by weight of the Pb; 0.20% by weight of the Zr and 0.01% by weight of the Sn. In this non-limiting embodiment, the steering gear housing 20 weighs less than 50%, specifically 46.67%, of a like steering gear housing made of iron. It should, however, be appreciated that the aluminum alloy could include different elements with different percentages by weight. Importantly, each of the nuts 102 is comprised of metal being stronger than the aluminum alloy. In a preferred embodiment, the nuts 102 comprise steel.

It should be apparent that the inventive steering gear assembly also includes a method for forming same. The method includes the step of adding aluminum alloy into an oven and heating it until it becomes molten. However, any means of heating the aluminum alloy could be employed without departing from the scope of the subject invention. Next, the aluminum alloy is gravity poured into a die defining a steering gear housing 20 that includes a plurality of mounting apertures 90 for attachment to a vehicle. Later, the aluminum alloy is cooled until it is hardened into a cast steering gear housing 20. The steering gear housing 20 is then removed from the die and at least partially anodized. In one embodiment, the entire steering gear housing 20 is anodized. In another embodiment, the casted steering gear housing 20 includes an inner surface 26 bounding a input shaft bore 34 that is anodized and an inner wall 36 bounding a sector shaft bore 44 that is also anodized.

A plurality of nuts are then press fit into the mounting apertures 90 in order to establish a press-fit relationship between each nut 102 and each respective mounting aperture 90 for preventing relative rotational movement between each of the nuts 102 and the steering gear housing 20. To assist the press-fit relationship, the nuts 102 each include a plurality of splines 118. In one embodiment, the casted steering gear housing 20 includes a plurality of through walls 88 each bounding one of the mounting apertures 90 and defining a receiving surface 120' deformed by the splines 118 in the press-fit relationship. In another embodiment, the casted steering gear housing 20 includes a plurality of through walls 88 each bounding one of the mounting apertures 90 and defining a splined surface 120" for mating with the plurality of splines 118 in the press-fit relationship. Each of the nuts 102 further includes a mounting flange 112 for abutment with the steering gear housing 20. Each of the nuts 102 defines a thread 116 bounding a fastener hole 114 for the attachment of fasteners as the steering gear housing 20 is attached the a vehicle.

In one embodiment, the step of adding aluminum alloy includes adding aluminum alloy comprising Al, Si, Fe, Cu, Mn, Mg, Zn, Ti, Pb, Zr and Sn. In another embodiment the added aluminum alloy comprises: 6.5-7.5% by weight of Si; approximately 0.2% by weight of Fe; approximately 0.1% by weight of Cu; approximately 0.1% by weight of Mn; 0.25-0.45% by weight of Mg; approximately 0.1% by weight of Zn; 0.08-0.2% by weight of Ti; approximately 0.20% by weight of Zr; and approximately 0.01% by weight of Sn. Again, it should be appreciated that the aluminum alloy could include different elements with different percentages by weight.

Certain features are, for clarity, described herein in the context of separate embodiments, may also be provided in combination in a single embodiment. Conversely, various features that are, for brevity, described in the context of a single embodiment, may also be provided separately or in any sub combination. Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A steering gear assembly comprising:
   a steering gear housing comprised of an aluminum alloy and defining an input body and a sector body for receiving steering gears;
   said input body defining an input shaft bore extending along an input axis A and bounded by an inner surface;
   said sector body defining a sector shaft bore extending along a sector axis B disposed in spaced and transverse relationship to said input axis A and bounded by an inner wall;
   at least one of said inner surface of said input shaft bore or said inner wall of said sector shaft bore being anodized;
   said steering gear housing defining a plurality of mounting apertures; and
   a plurality of nuts press fit into a respective one of said mounting apertures for use in mounting said steering gear housing to a vehicle.

2. An assembly as set forth in claim 1 wherein each of said plurality of nuts include an exterior nut surface defining a plurality of splines for establishing the press-fit relationship between said mounting apertures and said nuts.

3. An assembly as set forth in claim 2 wherein said steering gear housing includes a plurality of through walls each bounding one of said mounting apertures and defining a receiving surface deformed by said splines in said press-fit relationship for preventing relative rotational movement between each one of said plurality of nuts and said steering gear housing.

4. An assembly as set forth in claim 2 wherein said steering gear housing includes a plurality of through walls each bounding one of said mounting apertures and defining a splined surface mating with said plurality of uniform splines in said press-fit relationship for preventing relative rotational movement between each of said nuts and said steering gear housing.

5. An assembly as set forth in claim 2 wherein each of said plurality of nuts includes an interior nut surface defining a thread and bounding a fastener hole.

6. An assembly as set forth in claim 5 wherein said plurality of nuts are comprised of metal being stronger than said aluminum alloy.

7. An assembly as set forth in claim 6 wherein said plurality of nuts are comprised of steel.

8. An assembly as set forth in claim 1 wherein both of said inner surface of said input shaft bore and said inner wall of said sector shaft bore are anodized.

9. An assembly as set forth in claim 8 wherein said steering gear housing is completely anodized.

10. An assembly as set forth in claim 1 wherein said aluminum alloy comprises:
   5-7.5% by weight of Si;
   approximately 0.2% by weight of Fe;
   approximately 0.1% by weight of Cu;
   approximately 0.1% by weight of Mn;
   0.25-0.45% by weight of Mg;
   approximately 0.1% by weight of Zn;
   0.08-0.2% by weight of Ti;
   approximately 0.20% by weight of Zr; and
   approximately 0.01% by weight of Sn.

\* \* \* \* \*